United States Patent
Aoyama et al.

(10) Patent No.: US 8,872,529 B2
(45) Date of Patent: Oct. 28, 2014

(54) COMPONENT DETECTION DEVICE AND COMPONENT DETECTION METHOD

(75) Inventors: Yoshitaka Aoyama, Sakai (JP); Shoji Aoyama, Sakai (JP)

(73) Assignee: Yoshitaka Aoyama, Osaka (JP)

( * ) Notice: Subject to any disclaimer, the term of this patent is extended or adjusted under 35 U.S.C. 154(b) by 285 days.

(21) Appl. No.: 13/577,274

(22) PCT Filed: Jul. 1, 2010

(86) PCT No.: PCT/JP2010/061255
§ 371 (c)(1),
(2), (4) Date: Aug. 6, 2012

(87) PCT Pub. No.: WO2011/108130
PCT Pub. Date: Sep. 9, 2011

(65) Prior Publication Data
US 2012/0299577 A1 Nov. 29, 2012

(30) Foreign Application Priority Data
Mar. 5, 2010 (JP) .................................. 2010-049249

(51) Int. Cl.
*G01R 19/00* (2006.01)
*B23K 11/00* (2006.01)

(52) U.S. Cl.
CPC ................................. *B23K 11/0053* (2013.01)
USPC .......................... 324/713; 324/76.11; 324/691

(58) Field of Classification Search
CPC ..... B23K 11/0053; B23K 11/24; B23K 11/30
USPC ....................................... 324/76.11, 691–724
See application file for complete search history.

(56) References Cited

U.S. PATENT DOCUMENTS 5,220,514 A * 6/1993 John .............................. 702/53
6,724,202 B2 * 4/2004 Tanizawa ...................... 324/725

(Continued)

FOREIGN PATENT DOCUMENTS

| CN | 1046867 | 11/1990 |
|---|---|---|
| GA | 2 232 297 | 12/1990 |

(Continued)

OTHER PUBLICATIONS

Chinese Office Action issued May 27, 2014 in corresponding Chinese Patent Application No. 201080065166.1 with English translation.

(Continued)

*Primary Examiner* — Arleen M Vazquez
*Assistant Examiner* — Robert P Alejnikov, Jr.
(74) *Attorney, Agent, or Firm* — Wenderoth, Lind & Ponack, L.L.P.

(57) ABSTRACT

Provided is a component detection device, which is installable on component processing means which performs a predetermined operation to a conductive component interposed between one conductive member and another conductive member, the component detection device comprising a detection circuit (41) for distinguishing between the conductive component and a conductive foreign matter interposed between the one conductive member and the another conductive member, the detection circuit (41) being electrically connected between the one conductive member and the another conductive member, wherein the detection circuit (41) comprises: a reference voltage generating circuit section (43) for generating a reference voltage based on an input voltage; a voltage comparing circuit section (44) for comparing between the reference voltage and a detection voltage input from a detection terminal; and a sensitivity adjusting circuit section (45) for adjusting the detection voltage so that, when the conductive component is interposed between the one conductive member and the another conductive member, the detection voltage is equal to or smaller than the reference voltage, and when the conductive foreign matter is interposed between the one conductive member and the another conductive member, the detection voltage is larger than the reference voltage.

5 Claims, 7 Drawing Sheets

(56) References Cited

U.S. PATENT DOCUMENTS

| | | | |
|---|---|---|---|
| 7,466,119 B2 * | 12/2008 | Ito et al. | 324/76.13 |
| 2005/0284847 A1 | 12/2005 | Aoyama et al. | |
| 2008/0240895 A1 | 10/2008 | Aoyama et al. | |
| 2011/0186483 A1 | 8/2011 | Aoyama et al. | |

FOREIGN PATENT DOCUMENTS

| | | |
|---|---|---|
| GB | 2 232 297 | 12/1990 |
| JP | 2-284774 | 11/1990 |
| JP | 8-1353 | 1/1996 |
| JP | 08-211002 | 8/1996 |
| JP | 2789020 | 8/1998 |
| JP | 2000-094150 | 4/2000 |
| JP | 2000-176647 | 6/2000 |
| JP | 2001-259857 | 9/2001 |
| JP | 2002-224850 | 8/2002 |
| JP | 2004-82193 | 3/2004 |
| JP | 2007-167947 | 7/2007 |

OTHER PUBLICATIONS

International Preliminary Report on Patentability and Written Opinion of the International Searching Authority issued Oct. 11, 2012 in International (PCT) Application No. PCT/JP2010/061255.

International Search Report issued Sep. 21, 2010 in International (PCT) Application No. PCT/JP2010/061255.

* cited by examiner

COMPONENT DETECTION DEVICE AND COMPONENT DETECTION METHOD

TECHNICAL FIELD

The present invention relates to a component detection device and a component detection method, which are installable on component processing means which performs a predetermined operation to a conductive component interposed between one conductive member and another conductive member in, for example, a welding process for a vehicle body of an automobile or a welding process for a sheet metal of a home appliance, for distinguishing between the conductive component and a conductive foreign matter interposed between the two conductive members.

Note that, as the above-mentioned component processing means, there are known various means in the field of component transportation, component working, and other fields. Specific examples of the component processing means include an electrode portion of an electric resistance welder for welding a projection bolt serving as the conductive component to a counterpart member, and a stopper portion of a parts feeder for feeding a projection nut by applying a vibration to a circular bowl.

BACKGROUND ART

Figure 8:
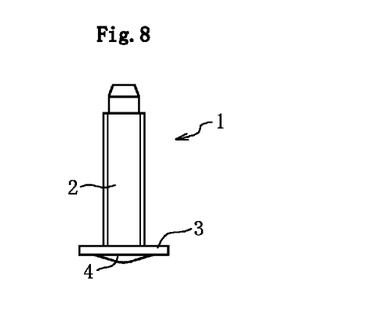
[FIG. 8] A diagram illustrating the bolt.

For example, as an electrode portion of an electric resistance welder for welding a projection bolt to a counterpart member, there is known an electrode disclosed in Patent Literature (for example, see Patent Literature 1). Note that, an iron projection bolt 1 (hereinafter, simply referred to as bolt) is, as illustrated in FIG. 8, a shaft-shaped component comprising a shaft portion 2 having an outer peripheral surface in which a male thread is formed, a flange portion 3 integrally formed with the shaft portion 2, and a welding projection 4 formed on a flange surface on a side opposite to the shaft portion 2. Further, the counterpart member is a plate-like component such as a steel plate.

Figure 9:
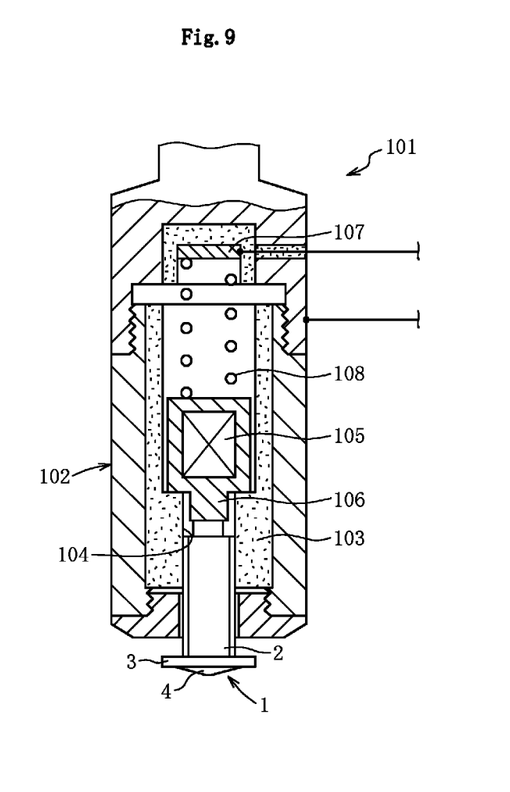
[FIG. 9] A sectional view illustrating a conventional electrode portion of an electric resistance welder.

FIG. 9 illustrates a schematic structure of an electrode portion 101 disclosed in Patent Literature 1. As illustrated in FIG. 9, in the electrode portion 101, a guide tube 103 made of an insulating material is inserted inside a substantially cylindrical, conductive electrode main body 102. Further, the electrode portion 101 is provided with a receiving hole 104, which is opened at an end surface of the electrode main body 102 in a state in which the receiving hole 104 is communicated to an inside of the guide tube 103. An inner peripheral surface of the receiving hole 104 in a part on an opening leading end side is formed of the conductive electrode main body 102.

On the other hand, inside the guide tube 103, which forms the inner peripheral surface of the receiving hole 104 in a part except for the part on the opening leading end side, a conductive rod 106 having a magnet 105 embedded therein is housed under a state in which the position thereof is restricted in an advancing direction (lower direction in FIG. 9). A coil spring 108 is provided in a tensioned state between the rod 106 and a conductive metal washer 107 arranged at the deepest portion of the receiving hole 104. In this manner, the rod 106 is arranged inside the receiving hole 104 in a freely advanceable/retractable state.

In the electrode portion 101, when the shaft portion 2 of the bolt 1 is inserted into the receiving hole 104, the shaft portion 2 of the bolt 1 is attracted by the magnet 105 embedded in the rod 106, and thus the shaft portion 2 is attached to a leading end portion of the rod 106. After the attachment, when the electrode portion 101 is pressurized to the counterpart member (not shown), the flange portion 3 is brought into intimate contact with the leading end surface of the electrode main body 102. Thus, there is formed an energizing path formed of the metal washer 107, the coil spring 108, the rod 106, the flange portion 3 of the bolt 1, and the leading end surface of the electrode mainbody 102. With energization through this energizing path, the state that the bolt 1 is present and the shaft portion 2 is normally inserted into the receiving hole 104 is detected.

As described above, after the state that the bolt 1 is present and the shaft portion 2 is normally inserted into the receiving hole 104 of the electrode portion 101 is detected, with the detection signal as a trigger, the electrode main body 102 is advanced, and thus the rod 106 is retracted against the elastic force of the coil spring 108. As a result, the flange portion 3 of the bolt 1 abuts against the end surface of the electrode main body 102. Under this state, a welding current is applied, thereby welding the projection 4 of the flange portion 3 to the counterpart member (not shown).

Note that, when the bolt 1 is absent or the bolt 1 is present but the shaft portion 2 thereof is abnormally inserted into the receiving hole 104, the above-mentioned energizing path is not formed. As a result, a non-energizing state is established, and the state that the bolt 1 is absent or the bolt 1 is present but the shaft portion 2 thereof is abnormally inserted into the receiving hole 104 can be detected. With this detection signal as a trigger, the electrode main body 102 is not advanced and the welding operation is stopped.

CITATION LIST

Patent Literature

Patent Literature 1: JP 2789020 B

SUMMARY OF INVENTION

Technical Problem

By the way, it is conceivable to use a relay for determining whether or not to start application of the welding current after detecting whether or not the bolt 1 is present and the shaft portion 2 thereof is normally inserted into the receiving hole 104 of the electrode main body 102 from the formation of the energizing path, which is formed when the flange portion 3 of the bolt 1 is brought into intimate contact with the leading end surface of the electrode main body 102 with the advancing of the electrode main body 102. In this case, the relay is electrically connected between the electrode main body 102 and the metal washer 107. As a voltage for operating this relay, a DC voltage of about 24 V is normally necessary.

As described above, in a case where a DC voltage of about 24 V is used as a relay operation voltage, when the bolt 1 is present and the shaft portion 2 thereof is normally inserted into the receiving hole 104 of the electrode main body 102, the electrode main body 102 and the flange portion 3 of the bolt 1, which form a part of the energizing path, are in an energizing state. At this time, when an operator touches the electrode main body 102 or the flange portion 3 of the bolt 1, the operator may involuntarily withdraw his/her hand by a sense of shock, which may cause an unexpected secondary disaster. Under such a situation, it is difficult to ensure a safe workplace.

On the other hand, it is conceivable to use an available proximity sensor or capacitance type sensor instead of using a relay in order to avoid the secondary disaster as described above. However, in a case of the proximity sensor, the proximity sensor is buried in the vicinity of the receiving hole 104, and hence, due to a magnetic field generated when the welding current is applied, the heat generated at the time of welding, or increase in the number of times of welding, a failure may occur in the operation of the proximity sensor after the welding, and there is a possibility that the proximity sensor cannot perform detection after that. Further, the capacitance type sensor is arranged between the metal washer 107 and the electrode main body 102 in the electrode structure illustrated in FIG. 9, and depends on capacitance. Therefore, there is a problem that the detection sensitivity of the capacitance type sensor is too high.

In a case of the capacitance type sensor, there is a possibility that, due to a conductive foreign matter such as water droplets and dust attached to the electrode portion 101, false detection may occur. For example, in the electrode portion 101 of the electric resistance welder, cooling water is used for preventing overheat at the time of welding. When the cooling water scatters at the time of overhauling and the like to enter the receiving hole 104 of the electrode portion 101, in the electrode portion 101 disclosed in Patent Literature 1, a false state that the bolt 1 is present is detected because, even though the bolt 1 is absent, the water droplets form a conduction state between the rod 106 and a part of the inner peripheral surface of the receiving hole 104 on the opening leading end side.

Further, when dust generated at the time of welding enters the receiving hole 104 of the electrode portion 101, similarly to the above-mentioned case, a false state that the bolt 1 is present is detected because, even though the bolt 1 is absent, the dust forms a conduction state between the rod 106 and the electrode main body 102 having a part positioned at the inner peripheral surface of the receiving hole 104 on the opening leading end side.

When such a false detection occurs, there has been a problem that, even though the bolt 1 is absent, the welding operation is started to cause false welding. The above-mentioned false detection is described as a problem that occurs in the electrode portion of the electric resistance welder, but in fact, the problem occurs also in fields of electrical detection other than electric resistance welding, such as component transportation.

Thus, the present invention has been made in view of the above-mentioned problems, and has an object to provide a component detection device and a component detection method, which ensure a safe workplace and are capable of preventing malfunction to be caused by a conductive foreign matter such as water droplets and dust.

Solution to Problem

As technical means for achieving the above-mentioned object, the present invention provides a component detection device, which is installable on component processing means which performs a predetermined operation to a conductive component interposed between one conductive member and another conductive member, the component detection device comprising a detection circuit for distinguishing between the conductive component and a conductive foreign matter interposed between the one conductive member and the another conductive member, the detection circuit being electrically connected between the one conductive member and the another conductive member, wherein the detection circuit comprises: a reference voltage generating circuit section for generating a reference voltage based on an input voltage; a voltage comparing circuit section for comparing between the reference voltage and a detection voltage input from between the one conductive member and the another conductive member; and a sensitivity adjusting circuit section for adjusting the detection voltage so that, when the conductive component is interposed between the one conductive member and the another conductive member, the detection voltage is equal to or smaller than the reference voltage, and when the conductive foreign matter is interposed between the one conductive member and the another conductive member, the detection voltage is larger than the reference voltage. "Sensitivity adjusting" herein means adjusting the detection voltage in order to distinguish between different objects, that is, the conductive component and the conductive foreign matter.

In the component detection device according to the present invention, before the component processing means performs the predetermined operation, when the conductive component is interposed between the one conductive member and the another conductive member, there is formed an energizing path formed of the one conductive member, the conductive component, and the another conductive member. In the present invention, the detection circuit comprising the reference voltage generating circuit section, the voltage comparing circuit section, and the sensitivity adjusting circuit section is electrically connected to the two conductive members.

In the detection circuit, the reference voltage generating circuit section generates the reference voltage of, for example, 2.5 V based on the input voltage of, for example, 5 V. The sensitivity adjusting circuit section adjusts the detection voltage so that, when the conductive component is interposed between the one conductive member and the another conductive member, the detection voltage is equal to or smaller than the reference voltage, and when the conductive foreign matter other than the conductive component is interposed between the two conductive members, the detection voltage is larger than the reference voltage, and the voltage comparing circuit section compares between the detection voltage and the reference voltage.

As a result of comparison between the detection voltage and the reference voltage in the voltage comparing circuit section, when the detection voltage is equal to or smaller than the reference voltage, it is determined that the conductive component is interposed between the two conductive members. In this case, the predetermined operation of the component processing means is started. Further, when the detection voltage is larger than the reference voltage, it is determined that the conductive foreign matter other than the conductive component is interposed between the two conductive members. In this case, the predetermined operation of the component processing means is stopped.

According to the present invention, it is desired that the detection voltage of the sensitivity adjusting circuit section comprises a voltage equal to or smaller than 15 V, which is safe and does not affect a human body. As described above, when the detection voltage of the sensitivity adjusting circuit section is set to a voltage equal to or smaller than 15 V, which is safe and does not affect the human body, even in a case where an operator touches the conductive member or the conductive component, the influence on the human body due to currents flowing from the sensitivity adjusting circuit section via the conductive member or the conductive component to the ground is eliminated. Thus, an unexpected secondary disaster never occurs, which is caused when the operator involuntarily withdraws his/her hand by a sense of shock. In this manner, a safe workplace can be easily ensured.

According to the present invention, it is desired that the component processing means comprises an electric resistance welder, the one conductive member and the another conductive member each comprise a part forming an electrode portion of the electric resistance welder, and the conductive component comprises a projection bolt. As described above, when the present invention is applied to a device comprising an electric resistance welder as the component processing means, parts forming an electrode portion of the electric resistance welder as the one conductive member and the another conductive member, and a bolt as the conductive component, it is possible to reliably detect, before welding the bolt to a counterpart member, whether the bolt is set to the electrode portion of the electric resistance welder, or whether the bolt is absent but the conductive foreign matter such as water droplets and dust is present.

The present invention provides a component detection method, which is installable on component processing means which performs a predetermined operation to a conductive component interposed between one conductive member and another conductive member, the component detection method comprising distinguishing, by a detection circuit electrically connected between the one conductive member and the another conductive member, between the conductive component and a conductive foreign matter interposed between the one conductive member and the another conductive member, wherein the distinguishing comprises: generating, by a reference voltage generating circuit section of the detection circuit, a reference voltage based on an input voltage; comparing, by a voltage comparing circuit section of the detection circuit, between the reference voltage and a detection voltage input from between the one conductive member and the another conductive member; and adjusting, by a sensitivity adjusting circuit section of the detection circuit, the detection voltage so that, when the conductive component is interposed between the one conductive member and the another conductive member, the detection voltage is equal to or smaller than the reference voltage, and when the conductive foreign matter is interposed between the one conductive member and the another conductive member, the detection voltage is larger than the reference voltage.

Advantageous Effects of Invention

According to the component detection device and the component detection method of the present invention, the detection circuit comprising the reference voltage generating circuit section, the voltage comparing circuit section, and the sensitivity adjusting circuit section is electrically connected to the two conductive members. Therefore, as a result of comparison between the reference voltage and the detection voltage adjusted by the sensitivity adjusting circuit section in the voltage comparing circuit section, when the detection voltage is equal to or smaller than the reference voltage, it is determined that the conductive component is present between the two conductive members, and further, when the detection voltage is larger than the reference voltage, it is determined that the conductive foreign matter other than the conductive component is interposed between the two conductive members. Thus, it is possible to determine whether the conductive component is present or whether the conductive foreign matter other than the conductive component is present between the two conductive members. In this manner, it is possible to prevent false detection to be caused by the conductive foreign matter. As a result, it is possible to prevent a state that the component processing means operates in a state in which the conductive component is absent but the conductive foreign matter is present, and it is possible to provide a very safe component detection device with high reliability.

DESCRIPTION OF EMBODIMENTS

A component detection device and a component detection method according to embodiments of the present invention are described in detail below. In the following embodiment, as an example, there are described the component detection device and the component detection method installed on an electrode portion of an electric resistance welder for welding a bolt to a steel plate.

An iron projection bolt 1 serving as a conductive component in this embodiment is, as illustrated in FIG. 8, a shaft-shaped component comprising a shaft portion 2 having an outer peripheral surface in which a male thread is formed, a circular flange portion 3 concentrically and integrally formed with the shaft portion 2, and a welding projection 4 formed on a flange surface on a side opposite to the shaft portion 2. The respective portions are sized so that the diameter of the shaft portion 2 is 6 mm, the length of the shaft portion 2 is 27 mm, and the diameter of the flange portion 3 is 14 mm. Further, a counterpart member to which the bolt 1 is welded is a plate-like component such as a steel plate.

Figure 4A:
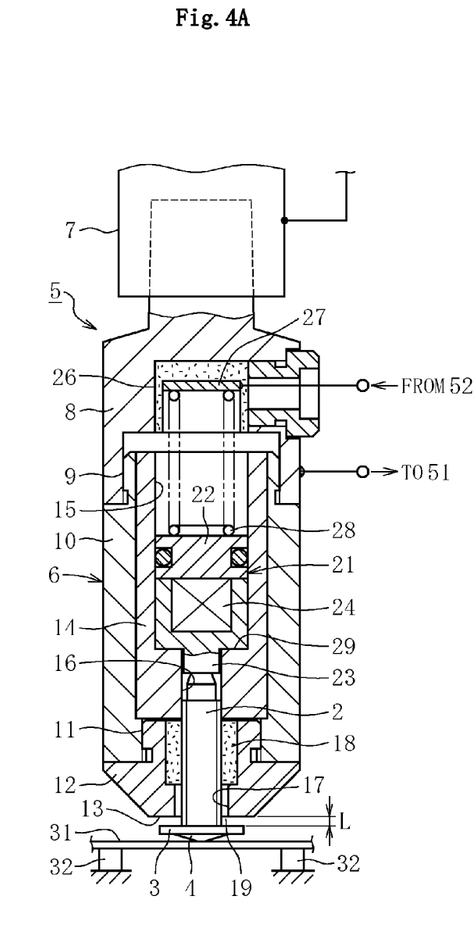
[FIG. 4A] A sectional view illustrating a state before an electrode portion of an electric resistance welder is caused to advance.
Figure 4B:
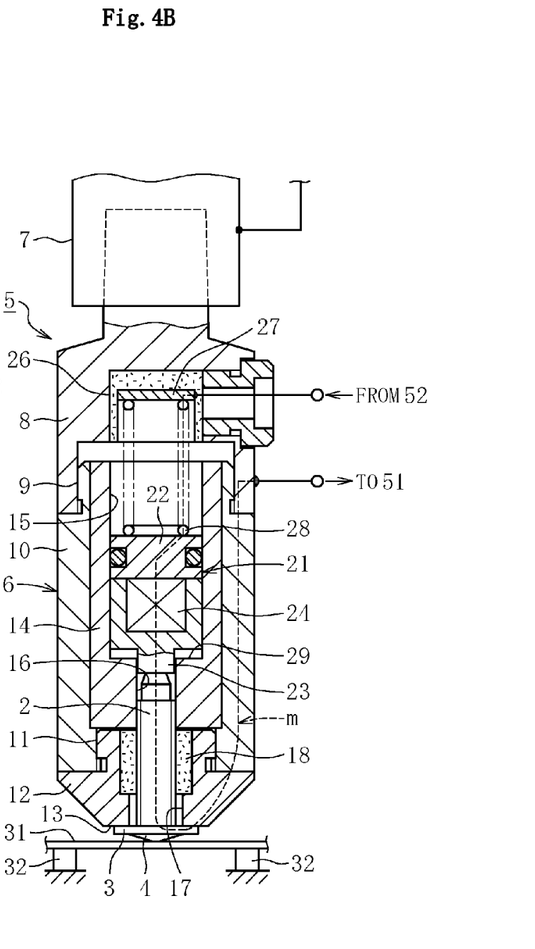
[FIG. 4B] A sectional view illustrating a state after the electrode portion of the electric resistance welder is caused to advance.

FIGS. 4A and 4B illustrate a schematic structure of an electrode portion 5 of an electric resistance welder for welding the above-mentioned bolt 1 to a steel plate 31. The electrode portion 5 advances/retracts by being operated by drive means (not shown) such as an air cylinder and an advance/retract output type electric motor.

The electrode portion 5 of the electric resistance welder comprises an electrode main body 6. The electrode main body 6 is a conductive cylindrical member made of a copper alloy material such as chromium copper. The electrode main body 6 comprises an upper electrode main body 8 fixed to a mounting member 7, an intermediate electrode main body 10 coupled to the upper electrode main body 8 via a threaded portion 9, and a lower electrode main body 12 coupled to an end portion of the intermediate electrode main body 10 via a threaded portion 11. An end surface of the lower electrode main body 12 is a flat electrode end surface 13 which is brought into intimate contact with the flange portion 3 of the bolt 1.

Inside the above-mentioned intermediate electrode main body 10, an insulating guide tube 14, which is made of a synthetic resin such as a urethane resin and a polyamide resin, is inserted, and there are formed a large diameter hole 15 and a small diameter hole 16 communicated thereto inside the guide tube 14. Further, the lower electrode main body 12 is provided with a receiving hole 17 into which the shaft portion 2 of the bolt 1 is inserted. The receiving hole 17 has one end communicated to the small diameter hole 16 of the guide tube 14, and another end opened at the electrode end surface 13. The central axis line of the receiving hole 17 matches with the central axis line of the electrode main body 6.

The inner surface of the receiving hole 17 has an insulating structure. This insulating structure is formed of an insulating tube 18 fitted into the lower electrode main body 12 and an air gap 19. The inner diameter of the insulating tube 18 is set to be slightly larger than the outer diameter of the shaft portion 2 of the bolt 1, and further, the inner diameter of the part of the air gap 19 is set to be sufficiently larger than the outer diameter of the shaft portion 2 of the bolt 1. Through setting of a dimensional relationship as described above, even when the shaft portion 2 of the bolt 1 is tilted with respect to the axis line of the electrode main body 6, the tilt angle is small, and thus the shaft portion 2 is prevented from being brought into contact with the inner surface of the part of the air gap 19. Note that, the inner diameter of the insulating tube 18 is set to be the same as the inner diameter of the small diameter hole 16 of the guide tube 14.

A columnar stopper member 21 for receiving the shaft portion 2 of the bolt 1 inserted inside the receiving hole 17 of the lower electrode main body 12 is arranged inside the guide tube 14 in a state in which the stopper member 21 is advanceable/retractable along the axis line of the electrode main body 6. The stopper member 21 comprises a large diameter portion 22 slidably fitted to the inner peripheral surface of the large diameter hole 15, and a small diameter portion 23, which is slidably fitted to the inner peripheral surface of the small diameter hole 16, for receiving the end portion of the shaft portion 2 of the bolt 1. A permanent magnet 24 is buried in the large diameter portion 22 of the stopper member 21. Therefore, the large diameter portion 22 is structured to have two divided parts, which are integrated by welding and the like.

Inside the upper electrode main body 8, an insulating cup member 26, which is made of a synthetic resin such as a urethane resin and a polyamide resin, is inserted under a state in which an opening thereof is directed downward. In a deep portion (upper portion in FIGS. 4A and 4B) of the cup member 26, a conductive terminal plate 27 made of a copper alloy is arranged. A compression coil spring 28 is provided in a tensioned state between the terminal plate 27 and the stopper member 21, and the tension thereof is received in such a manner that the large diameter portion 22 of the stopper member 21 is brought into pressure contact with a stopper surface 29 formed at a boundary part between the large diameter hole 15 and the small diameter hole 16 of the guide tube 14. Note that, the compression coil spring 28 is used in this embodiment, but instead of the compression coil spring 28, it is possible to use an air spring which causes a pressure of a compressed air to act on the upper surface of the stopper member 21.

Under a state in which the large diameter portion 22 of the stopper member 21 is brought into pressure contact with the stopper surface 29, the attraction force of the permanent magnet 24 acts on the shaft portion 2 of the bolt 1, and hence the end portion of the shaft portion 2 is attached to the end surface of the small diameter portion 23 of the stopper member 21. In a state illustrated in FIG. 4A, a minute gap L is provided between the electrode end surface 13 of the lower electrode main body 12 and the flange portion 3 of the bolt 1. In the case of FIG. 4A, the gap L is 1 mm. With the attraction force of the permanent magnet 24, the bolt 1 is prevented from dropping out from the receiving hole 17.

As illustrated in FIG. 4B, when the electrode portion 5 advances downward of FIG. 4B so that the welding projection 4 of the flange portion 3 of the bolt 1 is pressed against the steel plate 31, accordingly, the gap L is reduced and the compression coil spring 28 is compressed against its elastic force. Thus, the electrode end surface 13 of the lower electrode main body 12 and the flange portion 3 of the bolt 1 are brought into intimate contact with each other. The steel plate 31 serving as the counterpart member of the bolt 1 is positioned on a support jig 32, and a welding current flows from the support jig 32 toward the ground. Instead of the support jig 32, a fixed electrode (not shown) may be arranged on the lower side of the steel plate 31. In the state illustrated in FIG. 4B, the welding current is applied to the electrode portion 5, thereby welding the flange portion 3 of the bolt 1 to the steel plate 31.

In the electrode portion 5, the upper electrode main body 8, the intermediate electrode main body 10, and the lower electrode main body 12 form one conductive member, and the terminal plate 27, the compression coil spring 28, and the stopper member 21 form another conductive member. As illustrated in FIG. 4B, under a state in which the bolt 1 is present in the receiving hole 17 so that the end portion of the shaft portion 2 thereof abuts against the small diameter portion 23 of the stopper member 21 and the flange portion 3 abuts against the electrode end surface 13 of the lower electrode main body 12, there is formed an energizing path m formed of the terminal plate 27, the compression coil spring 28, the stopper member 21, the bolt 1, the lower electrode main body 12, the intermediate electrode main body 10, and the upper electrode main body 8. Through extraction of the formation of the energizing path m as a trigger signal, the welding between the bolt 1 and the steel plate 31 is started.

Figure 5:
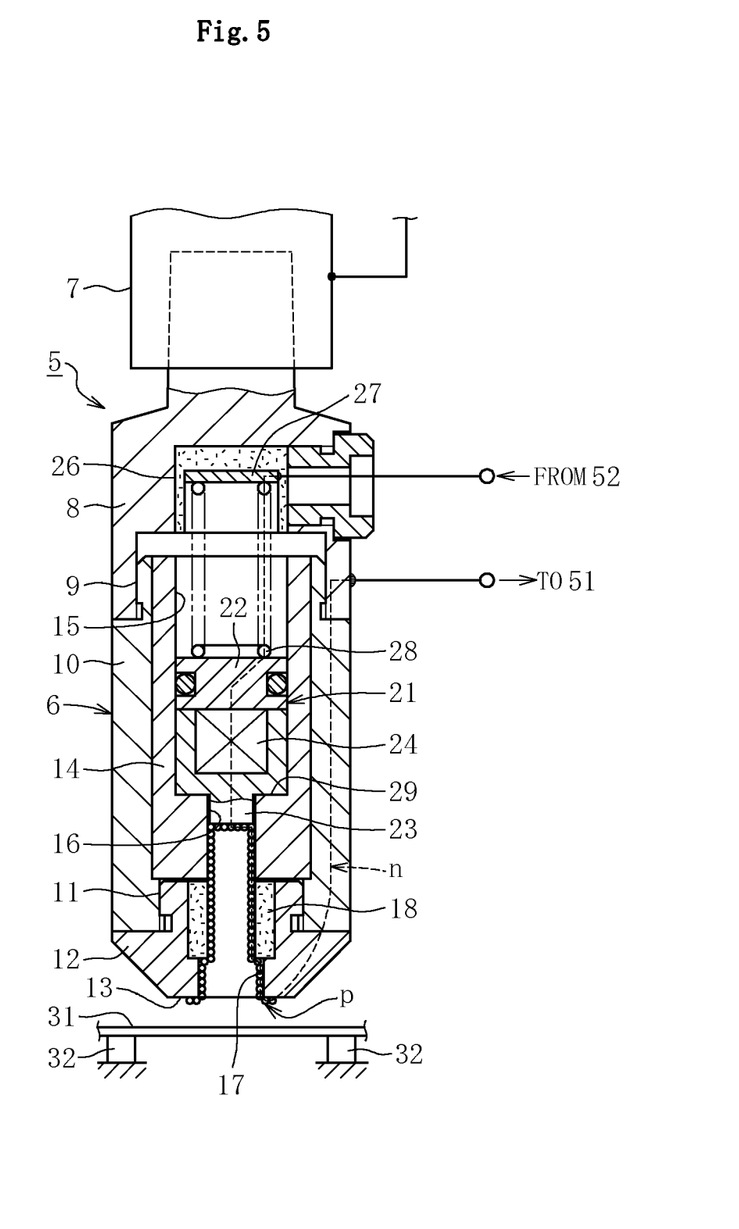
[FIG. 5] A sectional view illustrating a state in which the conductive foreign matter is attached to the electrode portion of the electric resistance welder.

On the other hand, as illustrated in FIG. 5, a similar energizing path is formed also in the case where, due to the supply failure of the bolt 1 to the electrode portion 5, the bolt 1 is absent in the receiving hole 17, but a conductive foreign matter p such as water droplets and dust is attached to the electrode end surface 13 and the receiving hole 17 of the lower electrode main body 12. That is, even in the state in which the conductive foreign matter p such as water droplets and dust is attached to the electrode end surface 13 and the receiving hole 17 of the lower electrode main body 12, there is formed an energizing path n formed of the terminal plate 27, the compression coil spring 28, the stopper member 21, the conductive foreign matter p, the lower electrode main body 12, the intermediate electrode main body 10, and the upper electrode main body 8. Note that, when the conductive foreign matter p is water, the water exists in a state of water droplets and a water film. For easy understanding, however, the conductive foreign matter p is illustrated in an exaggerated state in which round particles are arrayed.

In the case where the bolt 1 is present in the receiving hole 17 as illustrated in FIG. 4B, through extraction of the formation of the above-mentioned energizing path m as a trigger signal, the welding current may be applied to the electrode portion 5 to weld the flange portion 3 of the bolt 1 to the steel plate 31. However, as illustrated in FIG. 5, in the case where the bolt 1 is absent in the receiving hole 17, but the conductive foreign matter p such as water droplets and dust is attached to the electrode end surface 13 and the receiving hole 17 of the lower electrode main body 12 and thus the energizing path n is formed, it is necessary to stop the welding between the bolt 1 and the steel plate 31.

As described above, it is necessary to distinguish between the case where the bolt 1 is present and the case where the conductive foreign matter p is attached. In view of this, a component detection device, which is capable of detecting the attachment of the conductive foreign matter p such as water droplets and dust to the electrode end surface 13 and the receiving hole 17 of the lower electrode main body 12 and capable of distinguishing between the case where the bolt 1 is present and the case where the conductive foreign matter p is attached, is installed on the electrode portion 5.

Figure 1:
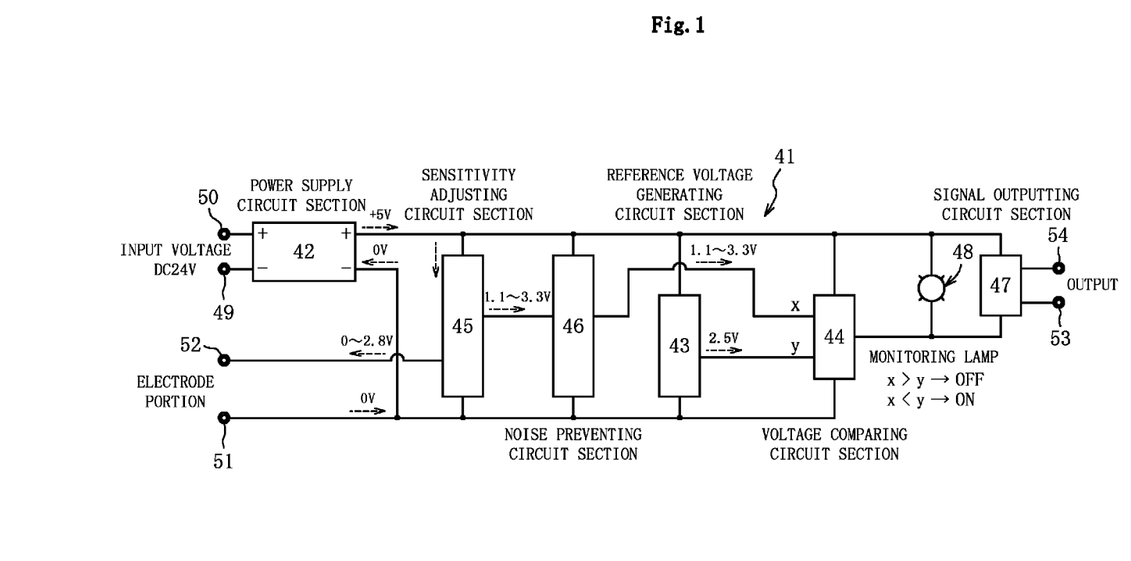
[FIG. 1] A circuit configuration diagram illustrating a detection circuit of a component detection device according to an embodiment of the present invention.

As illustrated in FIG. 1, the component detection device comprises a detection circuit 41 comprising, as main sections, a power supply circuit section 42, a reference voltage generating circuit section 43, a voltage comparing circuit section 44, and a sensitivity adjusting circuit section 45, and in addition, a noise preventing circuit section 46, a signal outputting circuit section 47, and a monitoring lamp 48. A DC voltage of 24 V, which is an input voltage of the electrode portion 5, is applied to power supply terminals 49 and 50 of the power supply circuit section 42. Further, of two input-side terminals 51 and 52, one input-side terminal 51 is connected to the upper electrode main body 8 of the electrode portion 5, and another input-side terminal 52 is connected to the terminal plate 27 of the electrode portion 5. With this, the detection circuit 41 is connected to the upper electrode main body 8 and the terminal plate 27. Further, output-side terminals 53 and 54 are output terminals for selecting whether or not to start the welding. The component detection device has the above-mentioned circuit configuration, and thus the component detection device is never affected by a magnetic field generated when the welding current is applied.

The above-mentioned power supply circuit section 42 of the detection circuit 41 converts the power supply voltage of 24 V into a circuit control voltage of 5 V. Note that, based on the circuit control voltage of 5 V output from the power supply circuit section 42, the reference voltage generating circuit section 43 generates a reference voltage of 2.5 V. The voltage comparing circuit section 44 compares between the reference voltage and a detection voltage generated between the terminal plate 27 and the upper electrode main body 8 when currents flow through the above-mentioned energizing path m or n. The sensitivity adjusting circuit section 45 adjusts the detection voltage so that the detection voltage generated in the energization state when the bolt 1 is present is equal to or smaller than the reference voltage, and that the detection voltage generated in the energization state when the bolt 1 is absent but the conductive foreign matter p other than the bolt 1, such as water droplets and dust, is interposed, is larger than the reference voltage.

Note that, the respective voltages output from the above-mentioned power supply circuit section 42 and reference voltage generating circuit section 43 are set to ensure reliable energization performance, and are settable in the following ranges. The input voltage of 24 V of the power supply circuit section 42 may be, for example, 20 V to 30 V, and the output voltage of 5 V of the power supply circuit section 42 may be, for example, 15 V or less as an operation voltage of the voltage comparing circuit section 44. The output voltage of 2.5 V of the reference voltage generating circuit section 43 may be, for example, 15 V or less so that the detection voltage of the sensitivity adjusting circuit section 45 becomes a voltage level that does not affect the human body. The respective voltages exemplified as described above may be changed to various values depending on the application position and the electrical environment of the device of the present invention.

Figure 2:
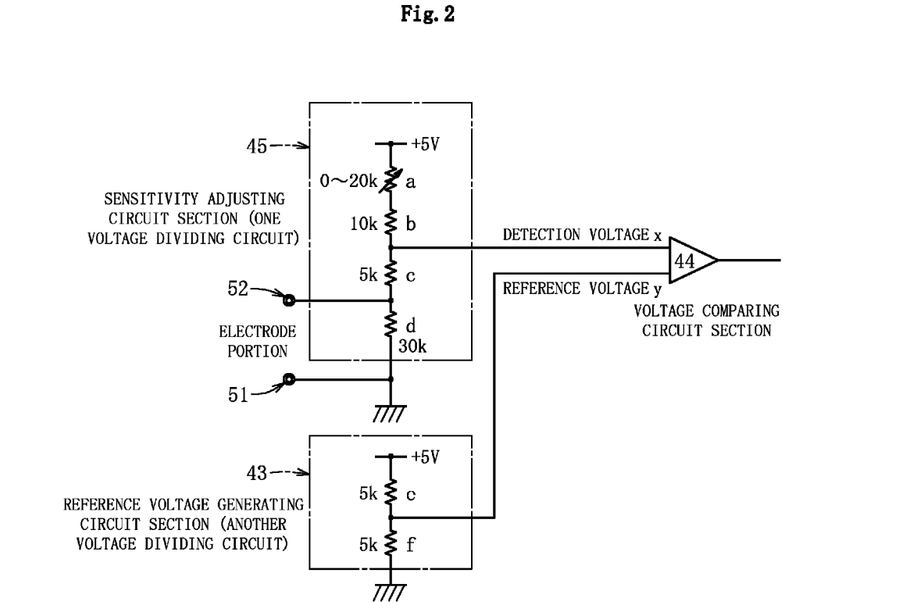
[FIG. 2] A circuit configuration diagram illustrating specific circuit examples of a sensitivity adjusting circuit section, a reference voltage generating circuit section, and a voltage comparing circuit section of FIG. 1.

The above-mentioned sensitivity adjusting circuit section 45 and reference voltage generating circuit section 43 are basically formed of two voltage dividing circuits as illustrated in FIG. 2. One voltage dividing circuit for generating a detection voltage x is formed of a series circuit comprising a variable resistor a of 0 to 20 kΩ, a resistor b of 10 kΩ, a resistor c of 5 kΩ, and a resistor d of 30 kΩ. A node between the resistor b and the resistor c is connected to one input of the voltage comparing circuit section 44 (for example, a comparator). Further, another voltage dividing circuit for generating a reference voltage y is formed of a series circuit comprising a resistor e of 5 kΩ and a resistor f of 5 kΩ. A node between the resistor e and the resistor f is connected to another input of the voltage comparing circuit section 44.

In such a circuit configuration, the reference voltage generating circuit section 43 (another voltage dividing circuit) generates the reference voltage y of 2.5 V, which is obtained by dividing the circuit control voltage of 5 V at e:f=1:1 by the resistor e of 5 kΩ and the resistor f of 5 kΩ. Further, the sensitivity adjusting circuit section 45 (one voltage dividing circuit) generates the detection voltage x, which is obtained by dividing the circuit control voltage of 5 V at a ratio of (a+b):(c+d) by the variable resistor a of 0 to 20 kΩ, the resistor b of 10 kΩ, the resistor c of 5 kΩ, and the resistor d of 30 kΩ. Note that, it is most appropriate to generate the divided voltages at the above-mentioned resistance (ratio) with respect to the bolt 1 having the above-mentioned dimensional shape, but the resistance (ratio) is not limited to the above-mentioned values.

The detection voltage x is preset through adjustment by the variable resistor a of the sensitivity adjusting circuit section 45. Adjustment is made by the variable resistor a so that under a state in which the receiving hole 17 of the lower electrode main body 12 is empty, or a state in which the bolt 1 is absent but the conductive foreign matter p such as water droplets and dust is attached in the receiving hole 17 of the lower electrode main body 12, the detection voltage x generated at that time becomes larger than the reference voltage y. In the circuit configuration of FIG. 2, when the conductive foreign matter p is present, there is a resistance of at least 15 kΩ or larger, and hence the resistor d becomes 15 kΩ. Even when the variable resistor a is 0Ω, a voltage obtained through division at a ratio of (a+b):(c+d)=1:2 by the resistors b, c, and d becomes the detection voltage x, which is larger than the reference voltage y. Further, in the case where the receiving hole 17 of the lower electrode main body 12 is empty, even when the variable resistor a is 0Ω, a voltage obtained through division at a ratio of (a+b):(c+d)=2:3 or more by the resistors b, c, and d becomes the detection voltage x, which is larger than the reference voltage y. This voltage setting can be confirmed by the monitoring lamp 48, which turns OFF by an OFF signal output from the voltage comparing circuit section 44 (see FIG. 1).

Through the above-mentioned adjustment by the variable resistor a, the detection voltage x generated when the bolt 1 is present becomes equal to or smaller than the reference voltage y. That is, in the circuit configuration of FIG. 2, in the case where the bolt 1 is present, the resistor d becomes 0Ω, and even when the variable resistor a is 0Ω, a voltage obtained through division at a ratio of (a+b):(c+d)=2:1 by the resistors b and c becomes the detection voltage x, which is equal to or smaller than the reference voltage y. This voltage setting can be confirmed by the monitoring lamp 48, which turns ON by an ON signal output from the voltage comparing circuit section 44 (see FIG. 1).

Note that, the noise preventing circuit section 46 removes electrical noise superimposed on the detection voltage of sensitivity adjusting circuit section 45 from the detection voltage. Further, the signal outputting circuit section 47 outputs an instruction signal to the welder based on the output of the voltage comparing circuit section 44.

In this case, the above-mentioned detection voltage of the sensitivity adjusting circuit section 45 is set to a voltage equal to or smaller than 3 V (2.8 V at a maximum), which is safe and does not affect the human body. Therefore, even when an operator touches the electrode main body 6 or the bolt 1, the influence on the human body due to currents flowing from the power supply circuit section 42 via the sensitivity adjusting circuit section 45 and the electrode main body 6 or the bolt 1 to the ground is eliminated. Thus, an unexpected secondary disaster never occurs, which is caused when the operator involuntarily withdraws his/her hand by a sense of shock. In this manner, a safe workplace can be easily ensured.

In the detection circuit 41, the input voltage of 24 V is converted by the power supply circuit section 42 into the circuit control voltage of 5 V, and the reference voltage y of 2.5 V is generated by the reference voltage generating circuit section 43 based on the circuit control voltage output from the power supply circuit section 42. The detection voltage x is adjusted by the sensitivity adjusting circuit section 45 so that the detection voltage x generated in the energization state when the bolt 1 is present is equal to or smaller than the reference voltage y, and that the detection voltage x generated in the energization state when the bolt 1 is absent or when the conductive foreign matter p other than the bolt, such as water droplets and dust, is interposed, is larger than the reference voltage y. The adjusted detection voltage x output from the sensitivity adjusting circuit section 45 and the reference voltage y are compared by the voltage comparing circuit section 44.

Figure 3A:
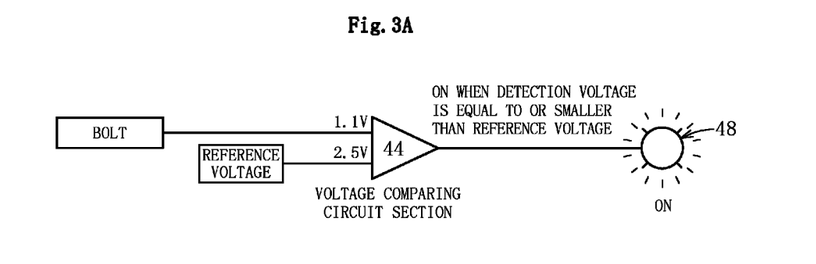
[FIG. 3A] A circuit configuration diagram illustrating an operation state of the voltage comparing circuit section of FIG. 2 in a case where a bolt is present.
Figure 3B:
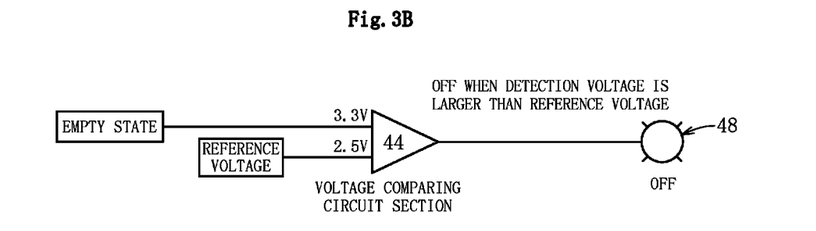
[FIG. 3B] A circuit configuration diagram illustrating an operation state of the voltage comparing circuit section of FIG. 2 in a case where a receiving hole of a lower electrode main body is empty.
Figure 3C:
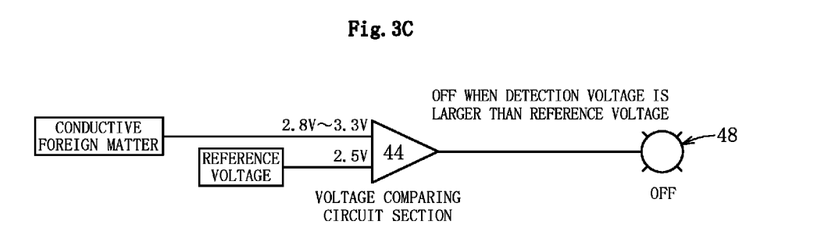
[FIG. 3C] A circuit configuration diagram illustrating an operation state of the voltage comparing circuit section of FIG. 2 in a case where a conductive foreign matter is present.

The reference voltage generating circuit section 43, the voltage comparing circuit section 44, and the sensitivity adjusting circuit section 45 illustrated in FIG. 2 are operated as follows. The voltage comparing circuit section 44 compares between the detection voltage x and the reference voltage y, and as a result, as illustrated in FIG. 3A, when the bolt 1 is present, the detection voltage x (1.1 V) becomes equal to or smaller than the reference voltage y (2.5 V), and thus the monitoring lamp 48 is turned ON by the ON signal output from the voltage comparing circuit section 44. The output voltage of the voltage comparing circuit section 44 is amplified by the signal outputting circuit section 47 to generate a control voltage, and based on the control voltage, the welding operation by the electric resistance welder is started. On the other hand, as illustrated in FIG. 3B, when the receiving hole 17 of the lower electrode main body 12 is empty, the detection voltage x (3.3 V) becomes larger than the reference voltage y (2.5 V), and further similarly, as illustrated in FIG. 3C, when the conductive foreign matter p other than the bolt 1, such as water droplets and dust, is interposed, the detection voltage x (2.8 V to 3.3 V) becomes larger than the reference voltage y (2.5 V). Thus, the monitoring lamp 48 is turned OFF by the OFF signal output from the voltage comparing circuit section 44, and the signal outputting circuit section 47 does not generate an output. In this manner, the welding by the electric resistance welder is stopped.

As described above, the voltage comparison circuit section 44 determines whether the bolt 1 is present, or whether the bolt 1 is absent (whether the receiving hole 17 of the lower electrode main body 12 is empty or the conductive foreign matter p other than the bolt 1, such as water droplets and dust, is present). Note that, an alarm lamp for notifying absence of the bolt 1 may be separately provided, which may be turned ON by the above-mentioned OFF signal.

Note that, in the detection circuit 41, through the provision of the noise preventing circuit section 46, the electrical noise superimposed on the detection voltage of the sensitivity adjusting circuit section 45 can be removed from the detection voltage, and hence the voltage comparing circuit section 44 can compare between the detection voltage and the reference voltage with higher accuracy. Therefore, it is possible to reliably determine whether the bolt 1 is present, or whether the bolt 1 is absent (whether the receiving hole 17 of the lower electrode main body 12 is empty or the conductive foreign matter p other than the bolt 1, such as water droplets and dust, is present).

In the above-mentioned embodiment, description is made of a case where the component detection device is applied to the electrode portion 5 of the electric resistance welder, but the present invention is not limited thereto. The present invention is applicable to other component processing means, for example, as illustrated in FIG. 6, to a stopper portion 62 of a parts feeder for feeding a projection nut 61 by applying a vibration to a circular bowl (see Japanese Patent No. 3309245).

Figure 6:
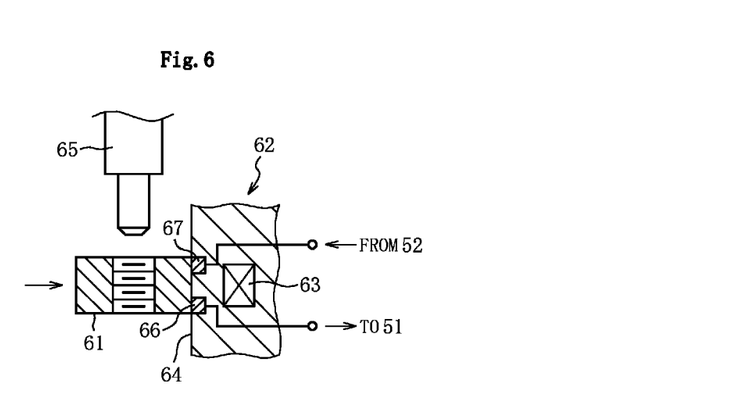
[FIG. 6] A sectional view illustrating a schematic configuration of a stopper portion of a parts feeder according to another embodiment of the present invention.

FIG. 6 illustrates a schematic configuration of the stopper portion 62 of the parts feeder. The stopper portion 62 is made of an insulating material, and receives the projection nut 61 (hereinafter, simply referred to as nut) supplied in the direction of the arrow illustrated in FIG. 6 by attracting the nut 61 by a buried permanent magnet 63 at a stopper surface 64. A guide rod 65 is inserted through the nut 61 stopped at the stopper surface 64 in a skewered state, and thus the nut 61 is supplied to an intended position.

In the stopper portion 62, a pair of conductive members 66 and 67 are provided in an exposed manner at a nut stop position of the stopper surface 64. Of the two input-side terminals 51 and 52 of the detection circuit 41 illustrated in FIG. 1, the one input-side terminal 51 is connected to one conductive member 66 of the stopper portion 62, and the another input-side terminal 52 is connected to another conductive member 67 of the stopper portion 62. With this, the detection circuit 41 is connected to the two conductive members 66 and 67.

Figure 7:
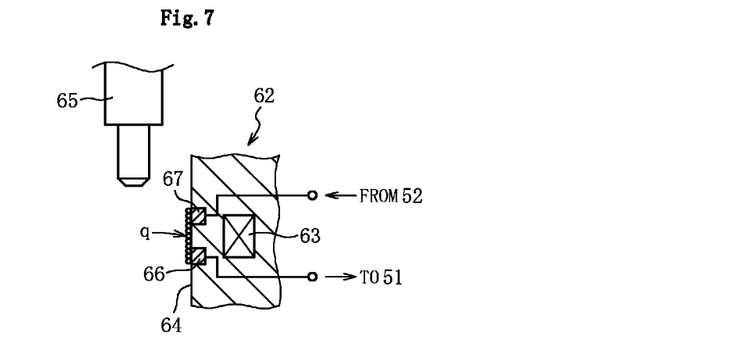
[FIG. 7] A sectional view illustrating a state in which the conductive foreign matter is attached to the stopper portion of the parts feeder.

In the stopper portion 62 having such a configuration, similarly to the case of the above-mentioned electrode portion 5 of the electric resistance welder, in the detection circuit 41, the voltage comparing circuit section 44 compares the detection voltage with the reference voltage, and as a result, when the detection voltage is equal to or smaller than the reference voltage, it is determined that the nut 61 is present. In this case, the skewering operation of the guide rod 65 is started. Further, when the detection voltage is larger than the reference voltage, it is determined that a conductive foreign matter q such as water droplets and dust is interposed (see FIG. 7). In this case, the skewering operation of the guide rod is stopped.

The present invention is not limited to the above-mentioned embodiments, and it should be understood that the present invention may be carried out in further various modes without departing from the gist of the present invention, and the scope of the present invention is described by the scope of claims, which includes meanings equivalent to the description of the scope of claims and all modifications within the scope.

Industrial Applicability

The present invention can be used by being installed on component processing means which performs a predetermined operation to a conductive component interposed between one conductive member and another conductive member in, for example, a welding process for a vehicle body of an automobile or a welding process for a sheet metal of a home appliance.

The invention claimed is:

1. A component detection device, which is installable on component processing means which performs a predetermined operation to a conductive component interposed between one conductive member and another conductive member, the component detection device comprising a detection circuit for distinguishing between the conductive component and a conductive foreign matter interposed between the one conductive member and the another conductive member, the detection circuit being electrically connected between the one conductive member and the another conductive member,
   wherein the detection circuit comprises:
      a reference voltage generating circuit section for generating a reference voltage based on an input voltage;
      a voltage comparing circuit section for comparing between the reference voltage and a detection voltage input from between the one conductive member and the another conductive member; and
      a sensitivity adjusting circuit section for adjusting the detection voltage so that, when the conductive component is interposed between the one conductive member and the another conductive member, the detection voltage is equal to or smaller than the reference voltage, and when the conductive foreign matter is interposed between the one conductive member and the another conductive member, the detection voltage is larger than the reference voltage.

2. A component detection device according to claim 1, wherein the detection voltage of the sensitivity adjusting circuit section comprises a voltage equal to or smaller than 15 V.

3. A component detection device according to claim 1,
   wherein the component processing means comprises an electric resistance welder,
   wherein the one conductive member and the another conductive member each comprise a part forming an electrode portion of the electric resistance welder, and
   wherein the conductive component comprises a projection bolt.

4. A component detection method, for a component processor that performs a predetermined operation to a conductive component interposed between one conductive member and another conductive member, the component detection method comprising distinguishing, by a detection circuit electrically connected between the one conductive member and the another conductive member, between the conductive component and a conductive foreign matter interposed between the one conductive member and the another conductive member,
   wherein the distinguishing comprises:
      generating, by a reference voltage generating circuit section of the detection circuit, a reference voltage based on an input voltage;
      comparing, by a voltage comparing circuit section of the detection circuit, between the reference voltage and a detection voltage input from between the one conductive member and the another conductive member; and
      adjusting, by a sensitivity adjusting circuit section of the detection circuit, the detection voltage so that, when the conductive component is interposed between the one conductive member and the another conductive member, the detection voltage is equal to or smaller than the reference voltage, and when the conductive foreign matter is interposed between the one conductive member and the another conductive member, the detection voltage is larger than the reference voltage.

5. A component detection device according to claim 2,
   wherein the component processing means comprises an electric resistance welder,
   wherein the one conductive member and the another conductive member each comprise a part forming an electrode portion of the electric resistance welder, and
   wherein the conductive component comprises a projection bolt.

* * * * *